United States Patent [19]

Vercellotti et al.

[11] Patent Number: 4,885,564

[45] Date of Patent: Dec. 5, 1989

[54] POWER LINE CARRIER COMMUNICATION SYSTEM FOR MONITORING REFRIGERATED CONTAINERS

[75] Inventors: Leonard C. Vercellotti, Oakmont; Arthur A. Anderson, Irwin, both of Pa.; David A. Christiansen, Bloomington; Dannis R. Johnson, Savage, both of Minn.; Laurence R. Brickner, Marathon, N.Y.; Robert G. Colclaser III, North Huntingdon, Pa.; John G. Leddy, Lexington, Mass.

[73] Assignee: Thermo King Corporation, Minneapolis, Minn.

[21] Appl. No.: 189,566

[22] Filed: May 3, 1988

[51] Int. Cl.[4] .......................................... H04M 11/04
[52] U.S. Cl. ............................. 340/310 A; 340/310 R
[58] Field of Search .......... 340/310 R, 310 A, 825.07; 364/551.01; 307/39, 40

[56] References Cited

U.S. PATENT DOCUMENTS

| | | |
|---|---|---|
| 3,911,415 | 10/1975 | Whyte . |
| 3,942,168 | 3/1976 | Whyte . |
| 3,942,170 | 3/1976 | Whyte . |
| 3,980,954 | 9/1976 | Whyte . |
| 4,190,800 | 2/1980 | Kelly Jr. et al. ............... 340/310 A |
| 3,967,264 | 6/1976 | Whyte et al. . |
| 4,234,926 | 11/1980 | Wallace et al. ...................... 364/551 |
| 4,302,750 | 11/1981 | Wadhwani et al. ............ 340/310 A |
| 4,316,262 | 2/1982 | Mizuta et al. .............. 340/310 A X |
| 4,379,284 | 4/1983 | Boykin ............................ 340/310 R |
| 4,402,191 | 9/1983 | King . |
| 4,409,797 | 10/1983 | King et al. . |
| 4,424,684 | 1/1984 | Waldschmidt et al. . |
| 4,453,156 | 6/1984 | Brown et al. ................... 340/310 R |
| 4,467,314 | 8/1984 | Weikel et al. .................. 340/310 A |
| 4,763,104 | 8/1988 | Inoue et al. ..................... 340/310 R |

Primary Examiner—Joseph A. Orsino
Assistant Examiner—Brian R. Tumm

[57] ABSTRACT

A power line carrier communication system for monitoring refrigerated containers which includes a master monitoring unit and a first power line interface which interchange messages in a first format. The first power line interface translates the first format to a second format suitable for power line environment, and messages in the second format are applied to a power line. Remote monitoring units receive the messages from the power line, and they return messages to the power line containing status data relative to refrigerated containers. The second format includes a message starting preamble having a duration and logic level which is not duplicated by normal operation of the apparatus, enhancing the probability of proper message synchronization and reception over noisy power line environments.

9 Claims, 4 Drawing Sheets

POWER LINE CARRIER COMMUNICATION SYSTEM FOR MONITORING REFRIGERATED CONTAINERS

BACKGROUND OF THE INVENTION

1. Field of the Invention

The invention relates in general to the monitoring of refrigerated containers, and more specifically to monitoring refrigerated containers over electrical distribution power lines.

2. Description of the Prior Art

Electrical utilities have used their high voltage transmission lines for many years for communication with remote switching and substation sites, for supervisory control purposes. Transmission lines are ideal for communication as they extend from the power generation site to the remote sites without intervening obstacles. Use of the distribution power lines, however, has been slower to develop, as the distribution power lines are susceptible to electrical noise and interference, and they include distribution transformers, electrical loads, sectionalizing switches, capacitor banks, and the like, which attenuate communication frequencies. The increasing desirability of being able to selectively and remotely control electrical loads on the distribution system, and the availability of low cost encoders for automatic meter reading, have produced a flurry of activity in the use of distribution power lines for communication purposes. U.S. Pat. Nos. 3,911,415; 3,942,168; 3,942,170; 3,967,264; and 3,980,954, describe some of the early problems encountered, and solutions thereto, when using electrical distribution power lines for communication.

A specialized use of electrical distribution power lines for communication purposes has been disclosed in U.S. Pat. No. 4,234,926. Refrigerated containers, called "reefers" are monitored by a central computer, using the power lines for polling or interrogating remotely located computerized monitoring units associated with the reefers, as well as for receiving reefer status data in return. Since large numbers of reefers are stacked aboard ships, as well as in ship terminals, the use of the electrical power lines connected to the reefers for the additional functions of monitoring and control substantially increases the speed and reliability of the monitoring process, which is normally manually performed.

While the use of ship and ship terminal electrical distribution lines for communication may seem simple and straight forward compared with the attenuating obstacles encountered by the electric utilities in using their distribution systems for communication, ship and ship terminal electrical systems can have substantial amounts of electrical noise. For example, large adjustable speed motor drives which chop the electrical waveform may be used, which feed large amounts of electrical noise back into the power lines.

SUMMARY OF THE INVENTION

Briefly, the present invention increases the reliability of power line carrier communications for monitoring refrigerated containers aboard ships and in ship terminals by making it easier for the communication system to detect the start of a message received over the power line. A master monitoring unit (MMU) having a computer directs the monitoring and control process, providing messages in a first format for a first power line interface also referred to as a network central control unit (NCCU). The NCCU translates the messages to a second format more suitable for the power line environment, it modulates the message, such as by frequency shift keying (FSK), and it places the translated messages on the electrical distribution power line. Remote monitoring units (RMUs) gather status information from the reefer's refrigeration units. The RMUs include second power line interfaces. The second power line interfaces are coupled to the power line and they demodulate the high frequency messages.

The RMUs sample the incoming line at a rate greatly in excess of the message bit rate, looking for a valid message starting preamble. The message itself has a predetermined logic level, such as a logic zero, in every ten message bits. The message starting preamble has at least ten consecutive bits at a logic level opposite to the predetermined logic level which must periodically occur in every ten message bits. If this periodic logic level is a logic zero, then the starting preamble must be at the logic one level for at least ten bit times. Since ten logic ones cannot occur during normal message composition and transmission, the chances of detecting the valid start of a message are greatly enhanced, and the chances of false starts once a message begins are minimized.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
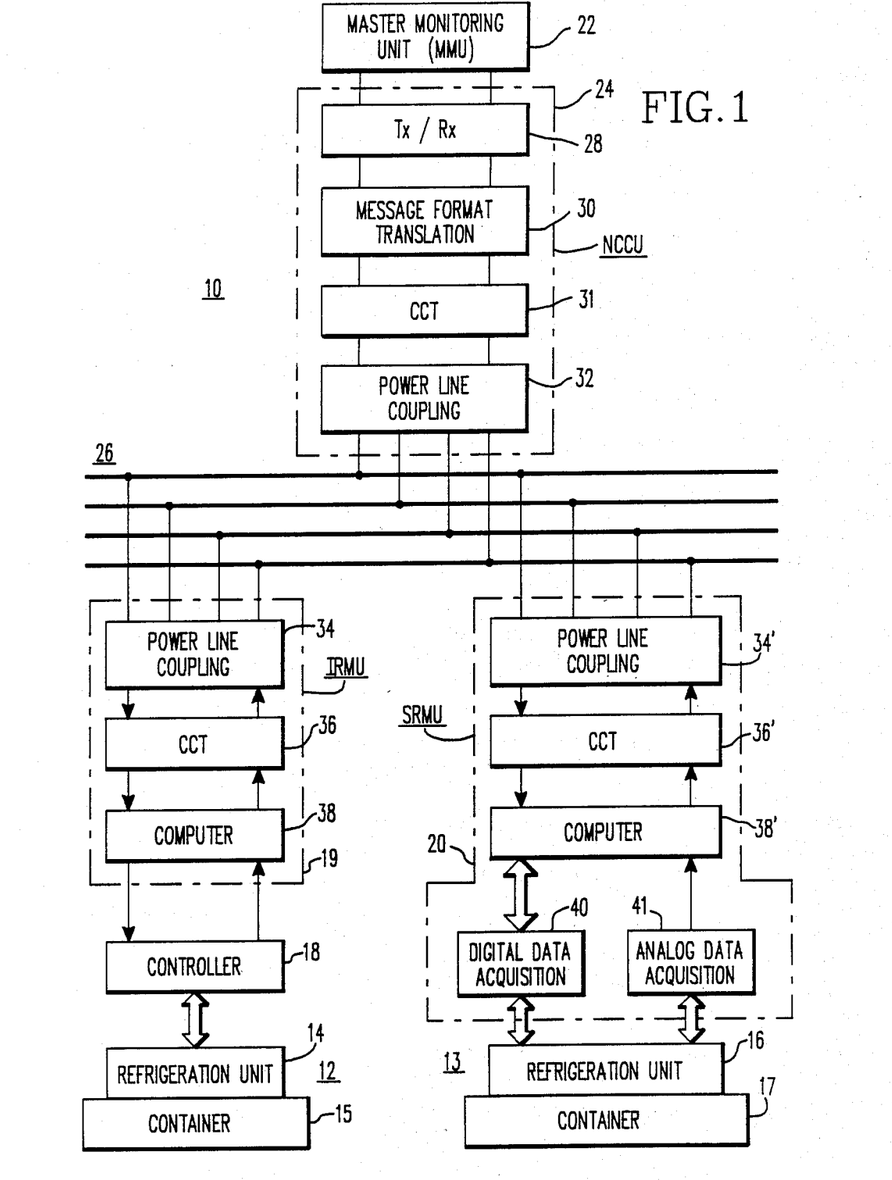
FIG. 1 is a functional block diagram of a power line carrier communication system for monitoring refrigerated containers according to the teachings of the invention.

Referring now to the drawings, and to FIG. 1 in particular, there is shown a functional block diagram of a power line carrier communication system 10 constructed according to the teachings of the invention. System 10 includes a plurality of transportable refrigerated containers or reefers, such as reefers 12 and 13. Reefer 12 includes a refrigeration unit 14 which conditions the air in a container 15, and reefer 13 includes a refrigeration unit 16 which conditions the air in a container 17. U.S. Pat. Nos. 4,402,191; 4,409,797; and 4,424,684, which are assigned to the same assignee as the present application, illustrate typical container refrigeration units.

Each reefer includes one of two different types of remote monitoring units, depending upon whether the reefer already has a computer based refrigeration controller, such as controller 18 associated with reefer 12. Controller 18 may be the refrigeration controller disclosed in U.S. Pat. No. 4,663,725 entitled "Microprocessor Based Control System And Method Providing Better Performance And Better Operation Of A Shipping Container Refrigeration System", which is assigned to the same assignee as the present application. This patent is hereby incorporated into the specification of the present application by reference.

Reefer 12, having a refrigeration controller 18, requires a remote monitoring unit 19, referred to as an integrated remote monitoring unit (IRMU). If the reefer does not have a controller 18, such as reefer 13, the RMU will include a data acquisition function which obtains status information directly from a refrigeration unit, and this type of RMU is referred to as a stand alone remote monitoring unit (SRMU) 20. IRMU 19 and SRMU 20 will be referred to collectively as "RMUs" when the distinction between them is not pertinent to what is being discussed.

Reefers 12 and 13 are monitored by a master monitoring unit (MMU) 22 which includes a central computer for preparing, transmitting and receiving messages. A network central control unit (NCCU) or first power line interface 24 is disposed between MMU 22 and an electrical distribution power line 26 which extends to the locations of the plurality of reefers 12 and 13. The communications between MMU 22 and NCCU 24 are not over power line 26, and thus a first message format is used which may be formulated with minimal concern with electrical noise. Thus, a generally accepted communications medium, such as an RS-232-C standard may be applied. NCCU 24 includes a transmitter/receiver 28 for receiving messages in the first format, translating means 30 for translating the first message format to a second message format tailored for the severe power line environment, a power line carrier transceiver (CCT) 31 for modulating the message, and power line coupling means 32 for applying the modulated message to power line 26.

IRMU 19 includes power line coupling means 34, a CCT 36 for demodulating messages received from power line 26, and computer means 38 for receiving messages from MMU 22 and for preparing and sending messages to MMU 22 when required. For example, if the message requested the status of reefer 12, IRMU 19 would send status information obtained from refrigeration controller 18 back to MMU 22. IRMU 19 would prepare the message in the second format in computer 38. CCT 36 modulates the message, and power line coupling means 34 applies it to power line 26. NCCU 24 detects the message via power line coupling means 32, CCT 31 demodulates the message, translating function 30 translates the message from the second to the first message format, and transmitter/receiver 28 sends the reformatted message to MMU 22.

SRMU 20 includes a power line coupling 34', a CCT 36', and a computer 38', all similar to these functions in IRMU 19. SRMU 20 further includes means 40 for obtaining data available in digital form from refrigeration unit 16, and means 41 for obtaining data available in analog form from refrigeration unit 16.

Figure 2:
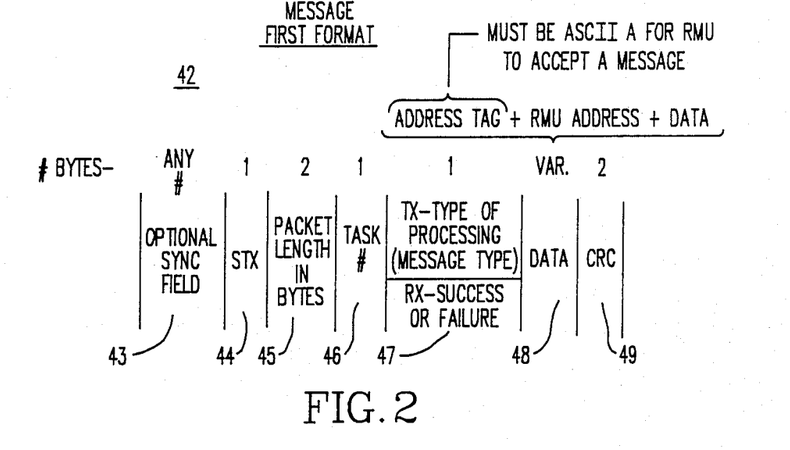
FIG. 2 illustrates a first message format, used between a master monitoring unit and a first power line interface.

A message format which may be used for the first format is shown in FIG. 2. The first format, referenced 42, will first be described as it is prepared by MMU 22.

The first message format 42 may start with an optional synchronization field 43 of any desired number of bytes, followed by a one byte start-of-text (STX) character 44 which delimits the start of a valid message. NCCU 24 strips the synchronization field 43, if used, from the start of a message. When a valid start byte 44 is detected, the next two bytes 45 are used to define an unsigned integer which indicates the packet length in bytes of the following data. The following data includes a one byte task number 46 assigned by MMU 22, which is an identification number used only by MMU 22. The identification number is followed by a one byte character 47 which informs NCCU 24 as to the message type, ie., the type of processing required. For example, the message may be directed only to NCCU 24, such as setting up internal configurations; or it may be a message which is to be applied to power line 26 directed to all of the the RMUs, or to a specifically addressed RMU. A variable length data field 48 follows the processing type identifier 47, with its contents depending upon the type of message to be processed. For example, if the message is to be applied to power line 26, the data field would contain an address tag, a universal or a specific RMU address, plus data relative to the type of command being sent.

When the communication is between NCCU 24 and a local power line, the address tag must be set to a predetermined value before the RMUs will respond to any message. For purposes of example, it will be assumed that the predetermined value is an ASCII "A" (41H). The address tag allows expansion of the monitoring system to include remote power lines, by using the address tag to address one or more remote power lines which are communicated with by radio. When an interface associated with a remote power line is addressed by the address tag, the remote interface will swap an ASCII "A" for the value in the address tag before applying the message to the associated power line. Thus, all reefers, regardless of which power line they are connected to will automatically be set up to respond to messages from MMU 22.

A two byte error check field 49 follows, such as a field generated by using the cyclic redundancy check (CRC), ie., a polynomial calculation performed on the message data bits.

The first message format 42 when prepared by NCCU 24 for transmission to MMU 22 includes the optional sync field 43, the starting character 44, and the two byte packet length 45. The task number used in field 46 is the same task number previously assigned to the MMU request for which this message is a response. NCCU 24 uses the one byte field 47 used by MMU 22 to indicate type of message, to indicate success or failure in implementing the command in the message received from MMU 22. The data field 48 includes the data resulting from the MMU command, e.g., RMU status data, followed by the CRC error checking field 49.

Figure 3:
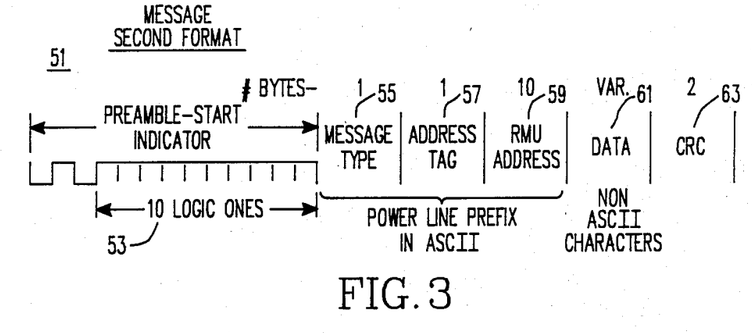
FIG. 3 illustrates a second message format, used on the electrical distribution power line.

FIG. 3 indicates the second message format 51, which is used for power line communications. A message starting preamble 53 includes at least three transition changes, required to synchronize communications between carrier receivers "listening" to the power line 26. The transitions are followed by a predetermined logic level which persists for at least the length of time required for 10 message bits. The message following the starting preamble 53 consists of a power line prefix 55, 57 and 59 in ASCII, and a data field 61 in non-ASCII characters, controlled in ANSI X3.28 format. Since each valid character consists of framing bits surrounding a byte of information, valid characters cannot be formed in either ASCII or non-ASCII which do not have a logic zero in every ten bits of a continuous message. The ten continuous bits of a predetermined logic level in the starting preamble have a logic level opposite to the periodic logic zero, and they are thus at the logic one level.

Figure 4:
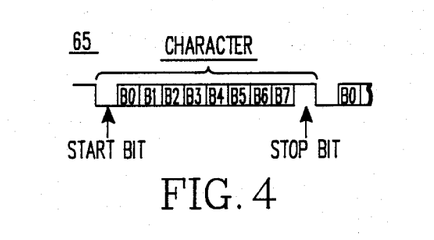
FIG. 4 illustrates normal message composition in which a logic zero, must appear in every ten bits.

The ten logic one bits in the starting preamble 53 must be detected before any message will be received. As hereinbefore stated, the formats of the ASCII and non-ASCII characters do not allow ten logic ones to be valid characters and they cannot occur within a message if the message is transmitted continuously. FIG. 4 sets forth the format 65 of a character byte. Format 65 has a low start bit, eight data bits BO through B7, and a high stop bit. Thus, it is important that in the second message format that there be no delay between bytes of a packet which exceeds one-half bit, as the line will be held high while awaiting more data. For example, if the eight data bit locations are high, the stop bit will make nine high bits in a row. A delay of one bit at this point will delay the normal low start bit and emulate a valid starting preamble 53. Since the starting preamble 53 cannot be transmitted by normal UART operation, the starting preamble will not interfere with higher level protocols, as would be the case if the starting preamble would require synchronizing on the reception of a particular valid asynchronous character.

The ten logic one bits also have the advantage of flushing the receiver's character buffer by allowing it to finish any character reception in progress and guarantee no new character will be received until the first character of the next valid message As hereinbefore stated, the valid starting preamble 53 is followed by fields 55, 57 and 59 collectively referred to as the power line prefix. Field 55 is used for the one byte message type, as prescribed by the message-type byte 47 described relative to the first message format 42 used between MMU 22 and NCCU 24. A reply message from an RMU will also use this same byte character in field 55.

Field 57 contains an address tag byte which is the same as that provided in the first byte of the data field 48 of the first message format 42. As hereinbefore stated the address tag is set to an ASCII "A" in communications between NCCU 24 and a local power line; and to a unique value recognized by power line carrier systems associated with remote power lines, when the monitoring system includes a radio link for communicating with one or more remote power lines.

Field 59 consists of ten bytes which define an address field. The address placed in field 59, which is the same address contained in the data field 48 of the first format 42, may be an address unique to a specific RMU, or it may be a universal address recognized by all RMUs. A universal address is used during system reset, and in the process of initially giving a RMU an unique address. When MMU 22 is polling for reefer status data, it will insert a specific RMU address.

The one byte message type 55, the one byte address tag 57, and the ten byte RMU address 59, collectively called the power line prefix, are all in ASCII characters.

The next field 61, variable in length, is the data field, and it contains data in non-ASCII characters, including control characters in ANSI X3.28 format. It will contain the specific command or task to be performed by an RMU. As hereinbefore stated, FIG. 4 indicates the format 65 of all characters, including prefix and data, which format includes a low start bit, eight data bits, and a high stop bit. Thus, there will always be at least one logic zero, i.e., the start bit, in every ten bit data character. The message ends with a two byte CRC error check field 63.

When a RMU responds to a command from MMU 22, it will prepare a message in the second format 51 just described, inserting the data requested by the specific MMU command in the data field 61.

Figure 5:
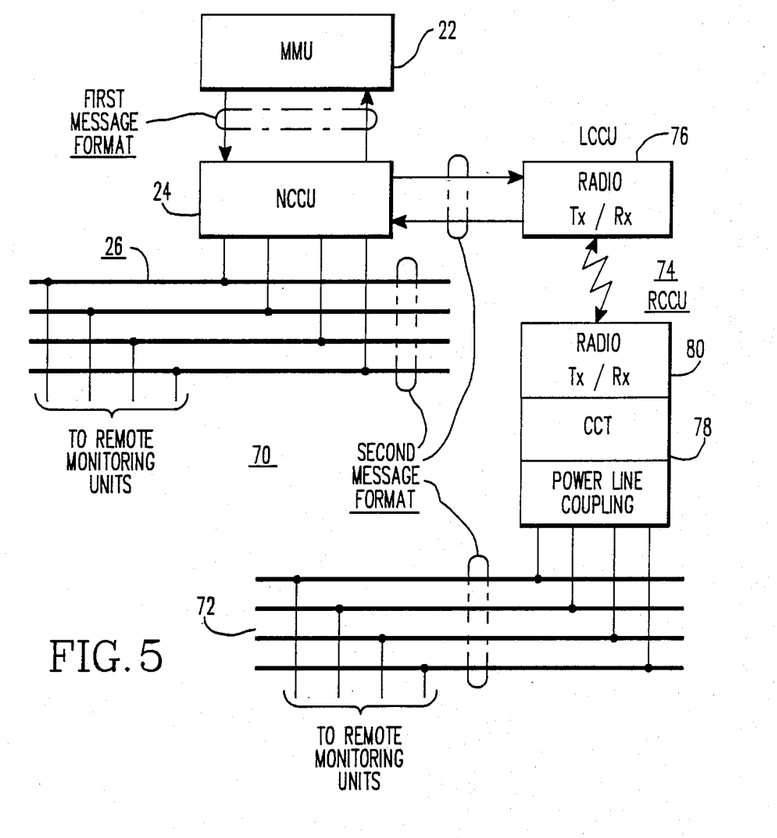
FIG. 5 is a block diagram of a power line carrier communication system constructed according to the teachings of the invention, illustrating message flow, and the locations of the two different message formats in the system.

FIG. 5 is a more detailed block diagram of a power line carrier communication system 70 which utilizes the same reference numerals as FIG. 1 where appropriate. NCCU 24 receives messages in the first format 42 and translates them to the second format 51. When the message is for RMUs connected to the local power line 26, MMU22 will have inserted an ASCII "A" into the address tag field 47 of the first format 42, which tells NCCU 24 that the message is for the local power line 26. NCCU 24 will maintain the ASCII "A" in the second format, appearing in field 57, and it will apply the message to power line 26.

When one or more remote power lines, such as remote power line 72, include reefers to be monitored, messages in the second format 51 are obtained from NCCU 24 and sent by radio link 74 to a remote power line interface. Radio link 74 includes a local central control unit (LCCU) 76 which includes a radio transmitter/receiver. Each remote power line, such as remote power line 72, includes a remote central control unit (RCCU) 78 which also has a transmitter/receiver. NCCU 24 translates messages received from MMU 22 from the first message format 42 to the second message format 51. The address tag located in field 48 of the first message format 42 an in field 57 of the second message format 51 provides a predetermined power line identification, which, as hereinbefore stated, will be assumed to be an ASCII "A" for the local power line. Thus, an ASCII "B", for example, may be used for messages destined for a first remote power line 72, etc. All RMUs, regardless of which power line they are connected to will only respond to messages which have an ASCII "A" in the address tag 57. If the message received by NCCU 24 from MMU 22 has an ASCII "A" in the address tag field 48, NCCU 24 simply applies the message to the local power line 26. If it has an identification other than an ASCII "A", LCCU 76 transmits the second formatted message by radio to all remote power lines. Each RCCU 78 receives the broadcast message, and if the address tag bears its unique identifier, the addressed RCCU 78 swaps its identifier for an ASCII "A" in the address tag field 57 and applies the message to its associated remote power line 72. Responses by the RMUs connected to the remote power line 72 are received by RCCU 78 which then swaps its identifier for the ASCII "A" in the address tag field 57 and broadcasts the message back to the LCCU 76, which directs the message to MMU 22 via NCCU 24. Thus, all RMUs, regardless of which power line they are connected to will see an ASCII "A" in the address tag field 57, and reefers and RMUs may be connected to any power line without modification.

Figure 6:
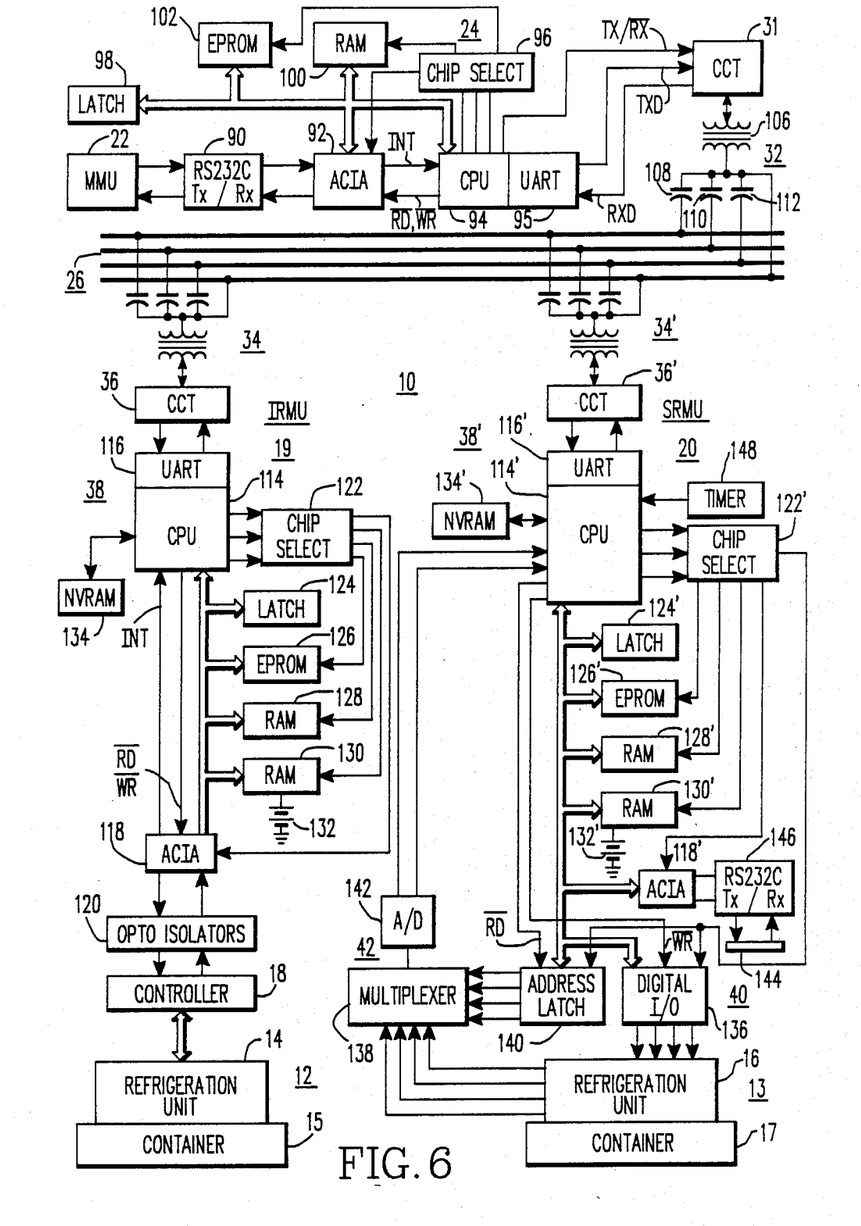
FIG. 6 is a detailed block diagram of the power line carrier communication system shown in FIG. 1.

FIG. 6 is a detailed block diagram illustrating an exemplary embodiment of power line communication system 10 shown in FIG. 1. NCCU 24 includes an RS-232 transmit/ receive chip 90, such as Maxim's MAX231, an asynchronous communications interface adapter (ACIA) chip 92, such as RCA's CDP65C51, a microcomputer 94 having an internal UART 95, such as Intel's 80C31, a chip select chip 96, an address latch 98, a random access memory (RAM) 100, an erasable programmable read-only memory (EPROM) 102, and the hereinbefore mentioned carrier current transceiver (CCT) 31, such as National Semiconductor's LM1893. The power line coupling means 32 for applying messages to, and receiving messages from, power line 26 includes a coupling transformer 106 having a winding connected to CCT 31 and a winding connected to the three phases and neutral of distribution power line 26 via coupling capacitors 108, 110 and 112.

A message prepared by MMU 22 is sent to RS-232 chip 90 and then to ACIA 92, with ACIA 92 being a program controlled interface between microcomputer 94 and the serial data provided by chip 90. Microcomputer 94 reformats the message from the first to the second formats, and the internal UART 95 sends the message to CCT 31 which FSK modulates the message and applies it to power line 26 via the coupling transformer and coupling capacitors broadly referenced 32, as they perform function 32 shown in block form in FIG. 1.

IRMU 19 includes coupling capacitors and a coupling transformer, broadly referenced 34, as they perform function 34 shown in block form in FIG. 1. A CCT chip 36 similar to chip 31, is connected to a microcontroller chip 114 which includes an internal UART 116. An ACIA chip 118, along with optoisolators 120, interface IRMU 19 with refrigeration controller 18. A chip select chip 122, an address latch 124, an EPROM 126, and a RAM 128, are also included, all of which may be similar to the chips in NCCU 24. In addition, IRMU 19 includes a RAM 130 backed by a battery 132. RAM 130 contains an image of the latest status information provided by controller 18 for rapid dumping to the power line 26 when requested by MMU 22, and it also includes a maintenance record of the reefer 12 it is associated with, downloaded by MMU 22. IRMU 19 also includes a nonvolatile RAM 134, which contains the unique address of the IRMU 19.

SRMU 20 does not require a computerized refrigeration monitor and controller 18 for data gathering purposes. Functions in SRMU 20 which may be the same as just described for IRMU 19 are given like reference numerals with a prime mark, and will not be described again. The data gathering function 40 shown in FIG. 1 for obtaining data from refrigeration unit 16 which is available in digital form is provided by a digital I/0 chip 136 which includes input status and an output latch under the control of computer 114'. The data gathering function 41 shown in FIG. 1 for obtaining data from refrigeration unit 16 available in analog form, such as data from temperature sensors, includes a multiplexer 138, such as RCA's 4051, which is addressed by an address latch 140 which is under the control of computer 114'. The output of multiplexer 138 is connected to computer 114' via an A/D converter 142. In the SRMU 20 the ACIA function 118' is connected to a plug-in receptacle 144 via an RS'232 chip 146 for optional communication with a hand held data retriever (not shown).

In addition, SRMU 20 also includes a battery and charger (not shown) so that data may be logged from reefer 13 by SRMU 20 without being connected to power line 26, and a timer 148 is provided to periodically provide signals which initiate the retrieval of status information from refrigeration unit 16.

We claim as our invention:

1. A power line carrier communication system for monitoring refrigerated containers, comprising:
    a local electrical distribution power line,
    a master monitoring unit,
    a first power line interface between said master monitoring unit, and said local electrical distribution power line,
    a plurality of refrigerated containers,
    and a plurality of remote monitoring units, one for each refrigerated container to be monitored by said master monitoring unit,
    said master monitoring unit preparing and transmitting messages to said first power line interface in a first message format,
    said first power line interface including means for transmitting messages to and receiving messages from said master monitoring unit, message translating means, and means for applying messages to and receiving messages from said local electrical power distribution line,
    said message translating means translating messages received from the master monitoring unit which are to be applied to the local electrical distribution power line into a second format, and translating messages received from the local electrical distribution power line to the first message format,
    each of said remote monitoring units including means for receiving said second format messages from said local electrical distribution power line, and processing means for processing said second format messages, with said processing means including means for obtaining status information from an associated refrigerated container, means for incorporating said status information into a message having the second message format, and means for applying said status message to the local electrical distribution power line.
    said second format including message information which includes a predetermined periodic logic level for at least one bit of every ten message bits, and a message starting preamble which includes the same logic level for at least ten consecutive bits, with this ten bit message starting logic level being different than said predetermined periodic logic level,
    said first message format including a field position which indicates type of assignment to be performed by the first power line interface in messages received from the master monitoring unit, and wherein the first power line interface uses said same field position to indicate assignment success or failure in messages sent to the master monitoring unit.

2. The power line carrier communication system of claim 1 wherein message information in both the first and second formats includes packets of characters, with each character having one start bit, eight data bits, and one stop bit, and wherein dead time between any two consecutive characters in the second format is less than one-half of a bit, to prevent a delay within a message from emulating the message starting preamble of the second format.

3. The power line carrier communication system of claim 1 wherein the first format includes a start byte followed by a two byte unsigned integer which indicates the packet length of the following message.

4. The power line carrier system of claim 1 wherein the plurality of remote monitoring units have a universal address to which all will respond, and each of the remote monitoring units have a unique address to which only it will respond.

5. A power line carrier communication system for monitoring refrigerated containers, comprising:
   a local electrical distribution power line,
   a master monitoring unit,
   a first power line interface between said master monitoring unit and said local electrical distribution power line,
   a plurality of refrigerated containers,
   a plurality of remote monitoring units, one for each refrigerated container to be monitored by said master monitoring unit,
   said master monitoring unit preparing and transmitting messages to said first power line interface in a first format,
   said first power line interface including means for receiving messages from said master monitoring unit, means for translating at least certain of the messages into a second format, and means or applying said second format messages to said local electrical power distribution line,
   each of said remote monitoring units including means for receiving said second format messages from said local electrical distribution power line, and means for processing said second format messages,
   said second format including message information which includes a predetermined periodic logic level for at least one bit of every ten message bits, and a message starting preamble which includes the same logic level for at least ten consecutive bits, with this ten bit message starting logic level being different than said predetermined periodic logic level,
   a remote electrical distribution power line having refrigerated containers connected thereto to be monitored by the master monitoring unit, remote radio means at the remote electrical distribution power line,
   and local radio means for transmitting messages initially prepared by the master monitoring unit to said remote radio means,
   said messages transmitted by said local radio means being in the second format, with said second format including an address field which identifies an electrical distribution power line the message is intended for.

6. The power line carrier communication system of claim 5 wherein the remote monitoring units will only accept a message which has an address tag which identifies the local electrical distribution power line, with the first power line interface applying a second format message to the local electrical distribution power line without changing the address tag, and wherein the remote radio means changes the address tag in a second format message to the address of the local electrical distribution power line before applying a message to the remote electrical distribution power line, enabling refrigerated containers to be connected to any electrical distribution power line without modification.

7. A power line carrier communication system for monitoring refrigerated containers, comprising:
   a local electrical distribution power line,
   a master monitoring unit,
   a first power line interface between said master monitoring unit and said local electrical distribution power line,
   a plurality of refrigerated containers,
   and a plurality of remote monitoring units, one for each refrigerated container to be monitored by said master monitoring unit,
   said master monitoring unit preparing and transmitted messages to said first power line interface in a first format,
   said first power line interface including means for transmitting messages to and receiving messages from said master monitoring unit, message translating means, and means for applying messages to and receiving messages from said local electrical power distribution line,
   said message translation means translating messages received from the master monitoring unit which are to be applied to the local electrical distribution power line into a second format, and translating messages received from the local electrical distribution power to the first message format,
   each of said remote monitoring units including means for receiving said second format messages from said local electrical distribution power line, and processing means for processing said second format messages, with said processing means including means for obtaining status information from an associated refrigerated container, means for incorporating said status information into a message having the second message format, and means for applying said status message to the local electrical distribution power line,
   said second format including message information which includes a predetermined periodic logic level for at least one bit of every ten message bits, and a message starting preamble which includes the same logic level for at least ten consecutive bits, with this ten bit message starting logic level being different than said predetermined periodic logic level,
   each of said remote monitoring units including a first computer,
   said means for obtaining status information in certain of the remote monitoring units including first status determining means, and the means for obtaining status information in certain other remote monitoring units including second status determining means, with the first status determining means including a refrigeration controller which includes a second computer, and with the second status determining means including direct connections to the refrigerated container which provide a plurality of status signals, with the first computer reading the status signals provided by said direct connections.

8. A power line carrier communication system for monitoring refrigerated containers, comprising:
   a local electrical distribution power line,
   a master monitoring unit,
   a first power line interface between said master monitoring unit and said local electrical distribution power line,
   a plurality of refrigerated containers,
   a plurality of remote monitoring units, one for each refrigerated container to be monitored by said master monitoring unit, said master monitoring unit preparing and transmitting messages to said first power line interface in a first format, said first power line interface including means for receiving messages from said master monitoring unit, means for translating at least certain of the messages into a second format, and means for applying said second format messages to said local electrical power distribution line, each of said remote monitoring units including means for receiving said second format messages from said local electrical distribution power line, and means for processing said second format messages, said second format including message information which includes a predetermined periodic logic level for at least one bit of every ten message bits, and a message starting preamble which includes the same logic level for at least ten consecutive bits, with this ten bit message starting logic level being different than said predetermined periodic logic level, and radio means for transmitting message prepared by said first power line interface to a remote power line carrier communication system associated with a remote electrical distribution power line having refrigerated containers connected thereto to be monitored by the master monitoring unit, said radio means transmitting messages in the second message format.

9. The power line carrier communication system of claim 8 wherein the messages prepared by the first power line interface for the radio means were initiated by the master monitoring unit.

* * * * *